US012345197B1

(12) United States Patent
Hoffman

(10) Patent No.: US 12,345,197 B1
(45) Date of Patent: Jul. 1, 2025

(54) MARINE ENGINES AND METHODS OF MAKING MARINE ENGINES HAVING CYLINDER LINERS

(71) Applicant: Brunswick Corporation, Mettawa, IL (US)

(72) Inventor: Daniel P. Hoffman, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/301,727

(22) Filed: Apr. 17, 2023

(51) Int. Cl.
*F02B 61/04* (2006.01)
*F02F 1/00* (2006.01)
*F02F 1/16* (2006.01)

(52) U.S. Cl.
CPC ............ *F02B 61/045* (2013.01); *F02F 1/004* (2013.01); *F02F 1/16* (2013.01)

(58) Field of Classification Search
CPC ............ F02B 61/045; F02F 1/004; F02F 1/16
See application file for complete search history.

(56) References Cited

U.S. PATENT DOCUMENTS 2,170,443 A * 8/1939 Jean-Baptiste ........... F02F 1/16 285/55
4,244,330 A * 1/1981 Baugh ..................... F02F 1/163 123/193.2
4,505,234 A * 3/1985 Meiners .................... F02F 1/16 123/193.2
4,562,799 A * 1/1986 Woods .................. F02F 7/0087 123/193.2
4,926,801 A * 5/1990 Eisenberg ............... F02F 1/163 123/193.2
5,357,921 A * 10/1994 Katoh ..................... F02F 7/008 123/193.2
7,000,584 B1 * 2/2006 Wynveen .................. F02F 1/16 123/193.2
10,006,419 B1 6/2018 Hoffman et al.
10,180,114 B1 * 1/2019 Maki ........................ B05D 7/22
10,233,862 B1 3/2019 Hoffman et al.
10,344,639 B1 7/2019 Nickols et al.
10,724,407 B1 7/2020 Hoffman et al.
10,858,974 B1 12/2020 Hoffman et al.
11,066,968 B1 7/2021 Nickols et al.
11,346,258 B1 5/2022 Nickols et al.
11,499,499 B1 * 11/2022 Hoffman ................. F02F 1/004
2003/0056645 A1 * 3/2003 Land ........................ F16J 10/04 123/193.2
2010/0206261 A1 * 8/2010 Berghian .................. F02F 1/16 123/193.2
2014/0325840 A1 * 11/2014 Morgan .................. B23B 47/34 29/888.061

OTHER PUBLICATIONS

Inventor's Declaration of Prior Art.

* cited by examiner

*Primary Examiner* — Kurt Philip Liethen
(74) *Attorney, Agent, or Firm* — Andrus Intellectual Property Law, LLP

(57) ABSTRACT

A marine engine and methods are for making a marine engine having a cylinder block which defines a cylinder bore and a liner disposed in the cylinder bore, the liner being axially elongated and providing a piston running surface. The liner has a first outer diameter surface portion which is axially constrained with respect to with an interior surface of the cylinder block and a second outer diameter surface portion which is axially unconstrained with respect to the interior surface of the cylinder block.

20 Claims, 4 Drawing Sheets

MARINE ENGINES AND METHODS OF MAKING MARINE ENGINES HAVING CYLINDER LINERS

FIELD

The present disclosure relates to marine engines, cylinder liners for marine engines, and methods of making marine engines having cylinder liners.

BACKGROUND

The following U.S. patents are incorporated herein by reference.

U.S. Pat. No. 10,233,862 discloses a marine engine comprises a cylinder block that defines a cylinder bore, a piston that reciprocates in the cylinder bore under force of combustion in the marine engine, and a liner disposed in the cylinder bore between the piston and the cylinder block. The liner provides a running surface for the piston. The liner has a cylindrical liner body that is sized to fit snugly within the cylinder bore and a pair of diametrically opposing tabs axially extends from liner body into the cylinder bore. Methods of making a marine engine are also disclosed.

U.S. Pat. No. 11,499,499 discloses a marine engine having a cylinder block defining at least one cylinder bore and a cylinder liner providing a running surface for a piston in the cylinder bore. The cylinder liner is non-axisymmetric relative to a center axis of the cylinder liner. The cylinder block defines a pocket that retains the cylinder liner and prevents the cylinder liner from rotating about the center axis. Novel cylinder liners, assemblies and methods are provided for forming a marine engine having the cylinder block with the cylinder liner formed therein.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In non-limiting examples disclosed herein, a marine engine comprises a cylinder block which defines a cylinder bore and a liner disposed in the cylinder bore, the liner being axially elongated and providing a piston running surface. The liner comprises a first outer diameter surface portion which is axially constrained with respect to with an interior surface of the cylinder block and a second outer diameter surface portion which is axially unconstrained with respect to the interior surface of the cylinder block.

Optionally, the first outer diameter surface portion extends along less than one quarter of the length of the liner and the second outer diameter surface portion extends along greater than three quarters of the length. Optionally, the first outer diameter surface portion comprises one or more grooves which are mated with a corresponding one or more grooves on the interior surface of the cylinder block and the second outer diameter surface portion is devoid of grooves. Optionally, the first outer diameter surface portion comprises a continuous helical groove which is mated with the interior surface of the cylinder block and the second outer diameter surface portion is devoid of grooves. Optionally, the first outer diameter surface portion is adjacent to the second outer diameter surface portion. Optionally, the second outer diameter surface portion is smoother than the first outer diameter surface portion. Optionally, the cylinder block and the liner are made of different materials. Optionally, the cylinder block is made of aluminum and the liner is made of iron.

Optionally, the cylinder block defines a water jacket which is located closer to the first outer diameter surface portion than the second outer diameter surface portion, wherein during operation of the marine engine a temperature differential occurs between the cylinder block and the liner due to the different materials, the temperature differential being larger along the second outer diameter surface portion than the first outer diameter surface portion due to cooling via the water jacket, and further wherein the second outer diameter surface portion being axially unconstrained with the interior surface of the cylinder block prevents radial separation between the second outer diameter surface portion and the interior surface of the cylinder block which otherwise would occur due to the temperature differential.

In non-limiting examples disclosed herein, a marine engine comprises a cylinder block which defines a cylinder bore and a liner disposed in the cylinder bore, the liner providing an elongated piston running surface. The liner comprises a first outer diameter surface portion which is mated with an interior surface of the cylinder block and a second outer diameter surface portion which is unmated with the interior surface of the cylinder block.

In non-limiting examples, methods are for making a marine engine, the methods comprising: providing a liner which is configured to provide a piston running surface, the liner having a first outer diameter surface portion and a second outer diameter surface portion which is smoother than the first outer diameter surface portion, and casting the liner in place in a cylinder bore of a cylinder block such that the first outer diameter surface portion is axially constrained with respect to an interior surface of the cylinder block and such that the second outer diameter surface portion is axially unconstrained with respect to the interior surface of the cylinder block.

Optionally, the first outer diameter surface portion extends along less than one quarter of the length and the second outer diameter surface portion extends along greater than three quarters of the length. Optionally, the method further comprises forming the liner out of iron and casting the cylinder block out of aluminum. Optionally, the method further comprises casting the cylinder block to define a water jacket which is located closer to the first outer diameter surface portion than the second outer diameter surface portion, such that during operation of the marine engine a temperature differential occurs between the iron of the liner and the aluminum of the cylinder block, the temperature differential being larger along the second outer diameter surface portion than the first outer diameter surface portion due to cooling via the water jacket, and further wherein the second outer diameter surface portion being axially unconstrained with the interior surface of the cylinder block prevents radial separation between the second outer diameter surface portion and the interior surface of the cylinder block which otherwise would occur due to the temperature differential.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
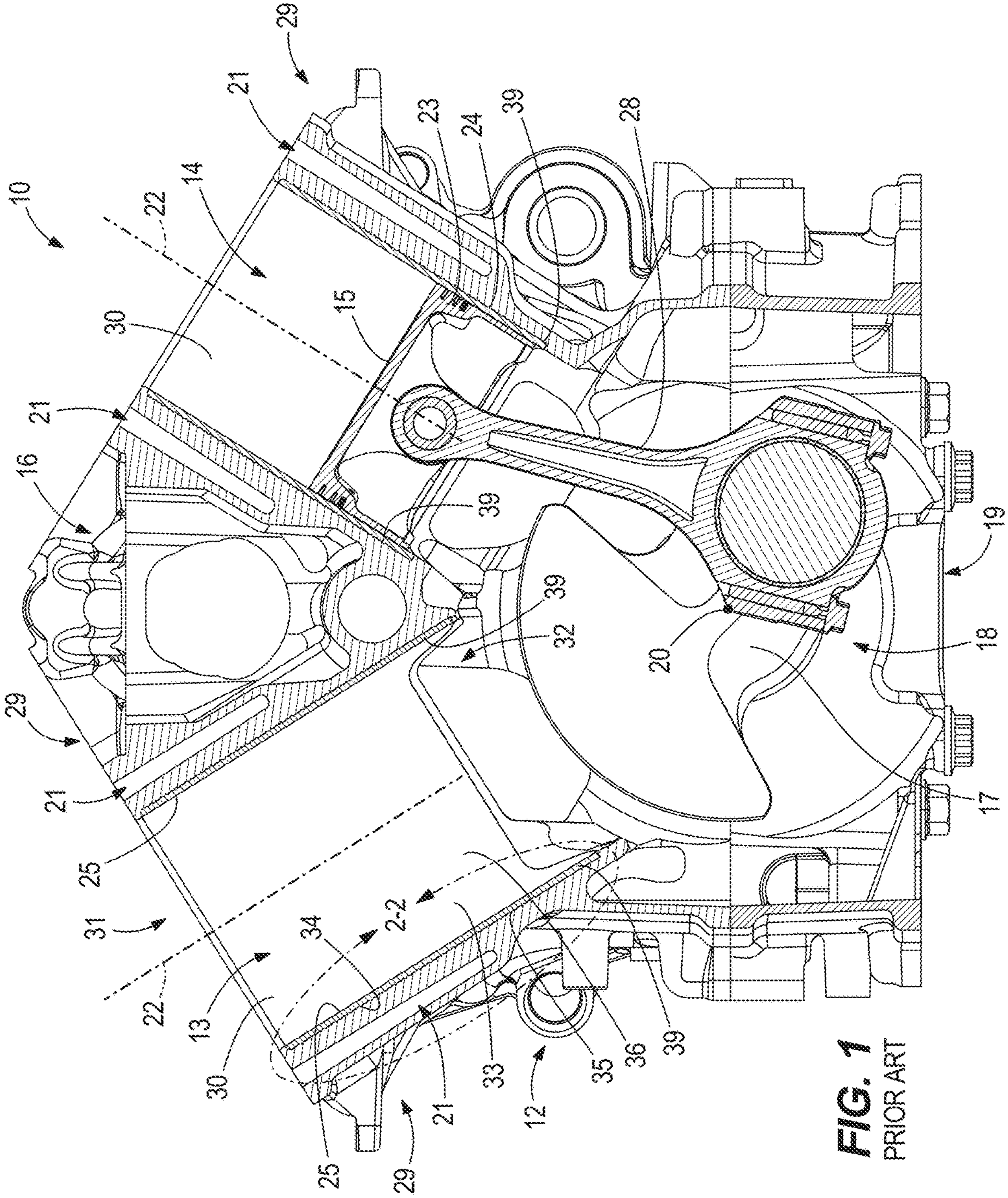
FIG. 1 PRIOR ART
FIG. 1 is a cross-sectional view of an example V-shaped marine engine.
Figure 2:
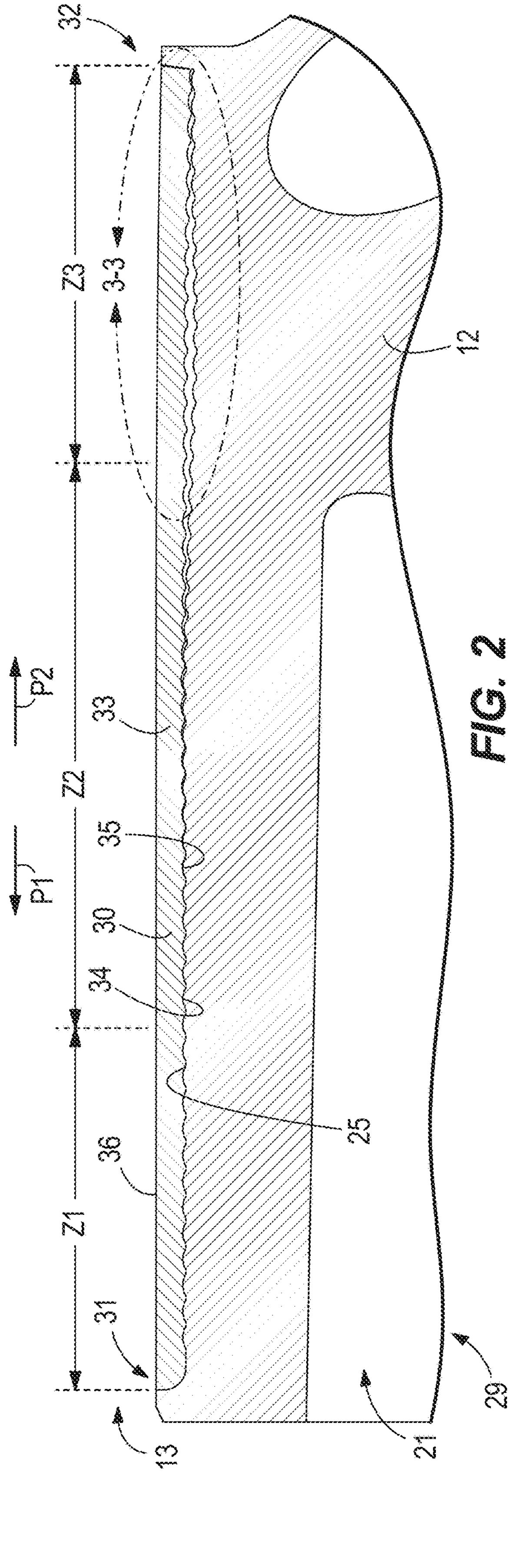
FIG. 2 PRIOR ART
FIG. 2 is an enlarged view within line 2-2 on FIG. 1.
Figure 3:
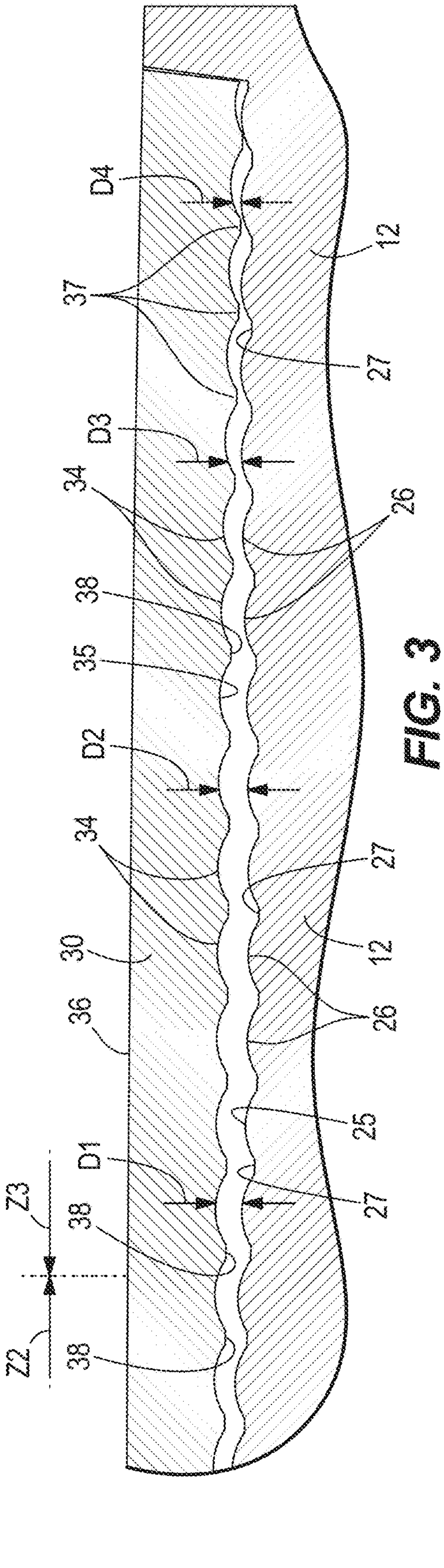
FIG. 3 PRIOR ART
FIG. 3 is an enlarged view within line 3-3 on FIG. 2.

FIGS. 1-3 depicts an internal combustion marine engine 10, which for example can be an outboard motor or stern drive, or any other type of marine drive. The engine 10 includes a cylinder block 12 having first and second banks of cylinder bores 13, 14. The first and second banks of cylinder bores 13, 14 extend transversely with respect to each other in a V-shape so as to define a valley 16 therebetween. This type of engine 10 is commonly referred to in the art as a V-style engine. It should be noted that although the embodiment shown in the drawings is a V-style engine, the concepts presented in this disclosure are equally applicable to other types of engine embodiments, including but not limited to embodiments having cylinders which are inline.

As is conventional, combustion of a fuel mixture in the engine 10 causes pistons 15 in each of the cylinder bores 13, 14 (note that only one piston 15 is depicted for clarity) to reciprocate along a center, longitudinally extending cylinder axis 22 of each cylinder bore 13, 14. The pistons 15 are coupled to a crankshaft 17 by connecting rods 28, and as conventional reciprocation of the pistons 15 in turn causes rotation of the crankshaft 17 about a crankshaft axis 20. The engine 10 further includes a crankcase 19 that defines an interior volume 18 which contains the crankshaft 17 and engine lubricant (e.g., oil) for lubricating and facilitating rotation of the crankshaft 17. An interior surface 25 of the cylinder block 12 faces and at least partially defines each cylinder bore 13, 14.

The cylinder block 12 is cast of aluminum by conventional methods using one or more stationary or movable forming dies (not depicted). Reference is made to the above-incorporated U.S. Patents for further disclosure on this. Prior to casting the cylinder block 12, liners 30 are provided in the forming dies such that the liners 30 are cast in place in and with the cylinder block 12. As such, a liner 30 is disposed in each cylinder bore 13, 14 and each liner 30 is disposed radially between the corresponding piston 15 and the interior surface 25 of the cylinder block 12. The liner 30 provides a running surface 36 for the piston 15 and has an opposite outer surface 35 that faces the interior surface 25 of the cylinder block 12. The liner 30 includes a first end 31 oriented away from the crankcase 19, an opposite second end 32 oriented toward the crankcase 19, and a cylindrical body 33 extending between the ends 31, 32. A pair of diametrically opposing tabs 39 are at the second end 32, and the tabs 39 are radially aligned and follow the contour of side surfaces 24 of a piston skirt 23 so as to provide a bearing surface for this piston skirt 23 as the piston 15 reciprocates in the liner 30. In some examples, the cylinder block 12 is made of aluminum and the liner 30 is made of iron.

The outer surface 35 of the liner 30 defines one or more grooves 34 recessed into the outer surface 35, and the grooves 34 are positioned along the body 33 between the ends 31, 32. In a non-limiting example, the grooves 34 are a plurality of annular grooves spaced apart from each other and the outer surface 35 has a plurality of peaks 38 positioned between each of the grooves 34. In another non-limiting example, the groove 34 is a continuous helical groove and the outer surface has a continuous peak. Note that the peaks 38 can have rounded edges or square edges, and in certain examples, the grooves 34 are interdigitated between peaks 38. When the liner 30 is cast in place in the cylinder block 12 (as noted above), the interior surface 25 of the cylinder block 12 that faces the liner 30 is imparted with one or more protrusions 26 that correspond with and form in the groove(s) 34 of the liner 30 and one or more valleys 27 that correspond to the peak(s) 38 of the liner 30. As such, the liner 30 and the interior surface 25 of the cylinder block 12 are mated together and the groove 34 and the protrusion 26 together define a mechanical interface between the liner 30 and the cylinder block 12 that resists axial movement of the liner 30 in the cylinder bore 13, 14 as the piston 15 reciprocates (as noted above) to thereby axially constrain the liner 30 in the cylinder bore 13, 14.

The engine 10 also includes cooling system, e.g., a water jacket 29, that is coupled to and/or integrally formed with the cylinder block 12, the water jacket 29 including one or more channels 21 positioned in the valley 16 and along the sides of the banks of cylinder bores 13, 14 through which coolant such as seawater is circulated to thereby cool components of the engine 10. The channels 21 partially extend along the sides of the cylinder bores 13, 14. However, due to the configuration and construction of the cylinder block 12, the channels 21 do not extend along the entire axial length of the cylinder bores 13, 14 and therefore cooling of the cylinder block 12 and liner 30 is not uniform.

The present inventors have observed through research and experimentation that the different components and areas of the engine 10 are subjected to different temperatures and temperature changes during operation of the engine 10. For example, said differences in temperature and temperature changes may be caused by combustion of the fuel mixture in the cylinder bores 13, 14 and/or friction between adjacent surfaces; however, said temperatures and temperature changes are not uniform in all the areas or components of the engine 10. In addition, the ability of the water jacket 29 to cool the engine 10 is limited to the areas where the channels are located (as noted above). As such, portions of the engine 10 located near the channels 21 are subjected to cooling while portions of the engine 10 spaced apart from the channels 21 are subjected to less or no cooling. This presents challenges. For example, over-cooling of the cylinder block 12 near the valley 16 can cause thermal stress and structural fatigue of the cylinder block 12 and/or the liners 30. The relatively hotter side of the cylinder block 12 near the crankcase 19 and/or the second ends 32 of the liners 30 tend to expand more or more quickly than the relatively cold side of the cylinder block 12 near the valley 16. The temperature differential and/or non-uniform temperatures between the cylinder block 12 and the liner 30 cause the cylinder block 12 and/or the liner 30 to be subjected thermal stresses and/or fatigue over time.

A person of ordinary skill in the art will recognize that the cooling provided by the coolant/water in the channel 21 of the water jacket 29 to the liner 30 and the cylinder block 12 will be different at different portions of the interface, the liner 30, and the cylinder block 12. That is, generally, more cooling is provided to portions of the interface, the liner 30, and the cylinder block 12 near the first end 31 of the liner 30 than portions of the interface, the liner 30, and the cylinder block 12 near the second end 32 of the liner 30. This difference in cooling, and thereby temperature of the interface, the liner 30, and the cylinder block 12, is a result of the channel 21 being positioned adjacent to the first end 31 and extending in an axial direction along the liner 30 toward the second end 32 of the liner 30 but terminating before reaching the second end 32 of the liner 30. In one non-limiting example, the differences in provided cooling cause the temperature of the interface, the liner 30, and the cylinder block 12 to gradually (but not necessarily uniformly) increase in a direction from the first end 31 to the second end 32. In another non-limiting example, the temperature of the interface, the liner 30, and the cylinder block 12 in a first zone Z1 is less than the temperature of these components in a second zone Z2 adjacent to the first zone Z1. The temperature in the second zone Z2 is greater than temperature in the first zone Z1 because the second zone Z2 is positioned closer to the second end 32 of the liner 30 than the first zone Z1. The temperature in the second zone Z2 will be less than the temperature in a third zone Z3 because the channel 21 does not extend into the third zone Z3 (although note that the channel 21 may provide some amount of cooling to the third zone Z3).

In addition, the present inventors have observed that components of the engine 10 having different material compositions, such as the aluminum cylinder block 12 and the iron liners 30, expand and contract at different rates as engine temperature changes. That is, different material compositions expand and contract differently as temperature in the engine 10 increases and decreases, respectively, and as cooling is provided by the water jacket 29 (as noted above). As such, thermal stresses in these materials are present at the material interfaces between components. For example, the present inventors have observed that thermal stresses are present at the interface between the groove 34 in the iron liner 30 and the aluminum cylinder block 12. FIGS. 2-3 depict this interface in greater detail. As is depicted in FIG. 2, the groove 34 and the protrusions 26 near the first end 31 of the liner 30 are in close proximity to the channel 21 of the water jacket 29. As such, these portions of the liner 30 and the cylinder block 12 within this first zone Z1 are cooled and have a generally lower temperature than other portions of the liner 30 and the cylinder block 12 in the second zone Z2 and the third zone Z3 (described further herein). As such, in the first zone Z1 thermal stresses within the liner 30 and the cylinder block 12 are less and the liner 30 and the cylinder block 12 maintain a tighter and/or abutting configuration relative to each other. The interface between the liner 30 and the cylinder block 12 within the first zone Z1 also axially constrains movement of the liner 30 in the cylinder bore 13. Note that in certain examples, the present inventors have observed the first zone Z1 to be approximately one-quarter the length of the liner 30 between the ends 31, 32.

However, the present inventors have further observed that the interface of the liner 30 and the cylinder block 12 in other zones closer to the second end 32 of the liner 30 (e.g., the second zone Z2 and the third zone Z3 are subjected to increased and/or non-uniform temperatures due to uneven cooling and/or cooling limits the water jacket 29 (as noted above). As such, the iron liner 30 and the aluminum cylinder block 12 in the second zone Z2 and the third zone Z3 experience relatively higher temperatures, respectively, in comparison to the temperature of the liner 30 and the cylinder block 12 in the first zone Z1. The higher temperatures increase the thermal stresses in the liner 30 and the cylinder block 12 and/or therebetween as these dissimilar materials expand and contract at different rates because of their thermal properties. Furthermore, the thermal stresses between the iron liner 30 and the aluminum cylinder block 12 may be amplified due to a temperature gradient within the second zone Z2 and the third zone Z3 that increases in a direction from the first end 31 to the second end 32 of the liner 30. This temperature gradient is caused by the water jacket 29 providing lesser amounts of cooling to the cylinder block 12 and the liner 30 within the second zone Z2 and minimal (or no) amount of cooling to the cylinder block 12 and the liner 30 within the third zone Z3.

The thermal stresses at the interface between the liner 30 and the cylinder block 12 and/or the frictionally generated axially forces applied by the piston 15 (FIG. 1) to the running surface 36, such as axial pushing and pulling forces in generally opposite axial directions (see arrow P1 and P2), cause the liner 30 and the cylinder block 12 within the second zone Z2 and the third zone Z3 to separate from each other. The separation occurs as the axial forces applied to the liner 30 combined with the thermal stresses of the liner 30 and the cylinder block 12 cause a camming effect at the interface between the liner 30 and the cylinder block 12. That is, the peaks 38 of the liner 30 between the grooves 34 tend to cam upwardly and outwardly along the protrusions 26 of the cylinder block 12 thereby inducing radial movement of the liner 30 relative to the cylinder block 12. Over time the liner 30 begins to separate from the cylinder block 12 and radial gaps or spaces are present between the liner 30 and the cylinder block 12. The liner 30 also may warp and the liner 30 geometry is not controlled for extended periods of time. Note that the separation distances between the liner 30 and the cylinder block 12 are larger in the third zone Z3 than the second zone Z2 due to the high temperature in the third zone Z3 relative to the cooler temperature in the second zone Z2. FIG. 3 depicts several separation distances D1-D4 in the third zone Z3 between the liner 30 and the cylinder block 12 that occurred due to the problems noted above. Note that the separation distances can vary. In certain examples, the separation distances D1-D4 vary in the range of 0.00-300.00 microns.

The present inventors have recognized that the separation of the liner 30 from the cylinder block 12 and/or the warping of the liner 30 negatively impact engine efficiency and operational maintenance requirements. The warped liner 30 increases blow-by gases that escape between the piston 15 and the liner 30 and the gap between the liner 30 and the cylinder block 12 permit flow and trap oil in the gap thereby increasing lubricant consumption of the engine 10. To reduce and/or eliminate the problems described above, the present inventors endeavored to develop new cast-in-place liners and methods for liner installation described herein. In particular, the present disclosure provides new liners, new marine engines having the liners cast-in-place in the cylinder block, as well as new methods and assemblies for casting the liners in place.

Figure 4:
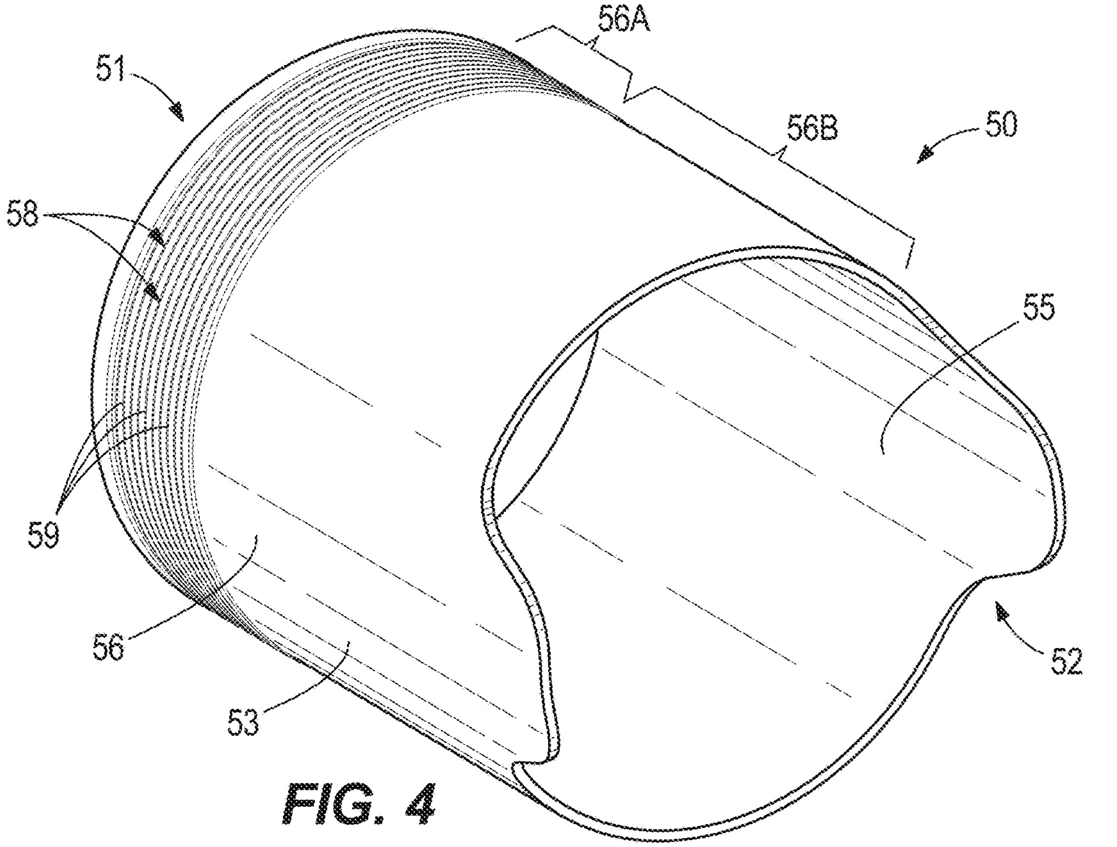
FIG. 4 is a perspective view of an example liner according to the present disclosure.
Figure 5:
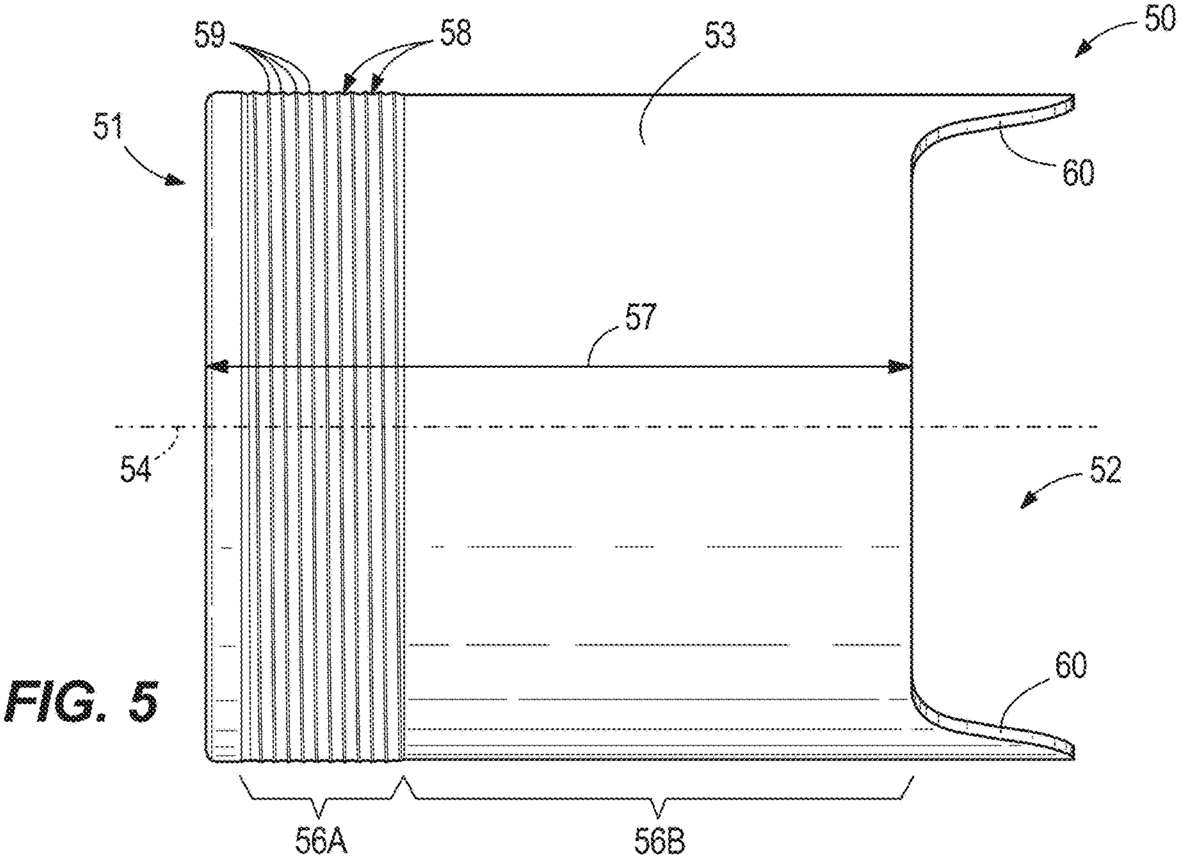
FIG. 5 is a side view of the example liner depicted in FIG. 4.

Referring now to FIGS. 4-5, an example liner 50 according to the present disclosure is depicted. In a preferred embodiment, the liner 50 is cast-in-place into the cylinder block 12 shown in FIG. 1 such that the liner 50 is disposed in one of the cylinder bores 13, 14. The liner 50 includes a first end 51, an opposite second end 52, and a body 53 extending between the end 51, 52. A pair of diametrically opposing tabs 61 are at the second end 52. The liner 50 is axially elongated along an axis 54, and has an end-to-end axial length 57. The liner 50 includes an inner running surface 55 along which the piston 15 (FIG. 1) reciprocates and an opposite outer diameter surface 56 that faces the interior surface 25 of the cylinder bore 13, 14 (see FIG. 1). The liner 50 can be formed of any suitable material and in some instances, the material of the liner 50 is different than the material of the cylinder block 12 (FIG. 1). In a non-limiting example, the liner 50 is formed of iron and the cylinder block 12 is formed by aluminum.

The outer diameter surface 56 has a first outer diameter surface portion 56A that is adjacent to a second outer diameter surface portion 56B. In certain examples, the first outer diameter surface portion 56A extends along one-quarter or less of the length 57 and the second outer diameter surface portion 56B extends along three-quarters or more of the length 57. In another example, the first outer diameter surface portion 56A extends along less than one-quarter of the length 57 and the second outer diameter surface portion 56B portion extends along greater than three-quarters of the length 57. The first outer diameter surface portion 56A comprises a plurality of grooves or one continuous helical groove 58 which is mated with the interior surface 25 of the cylinder block 12 having a corresponding protrusion 26 and the second outer diameter surface portion 56B is devoid of grooves. As such, in this example, the first outer diameter surface portion 56A is axially constrained with respect to the interior surface 25 of the cylinder block 12 and the second outer diameter surface portion 56B is axially unconstrained with respect to the interior surface 25 of the cylinder block 12. In certain examples, the groove 58 has a cross-sectional profile shape or geometry that is constant along the length of the groove 58. In one non-limiting example, the groove 58 has a cross-sectional shape that is a semicircle having a 0.25 millimeter (mm) deep radius into the first outer diameter surface portion 56A.

In non-limiting examples, the second outer diameter surface portion 56B is smoother than the first outer diameter surface portion 56A. In certain examples, the second outer diameter surface portion 56B has an average surface profile height in a range of 0.001-0.010 mm. In certain examples, the surface profile height along the second outer diameter surface portion 56B is 0.004 mm and the surface profile height of the groove is 0.25 mm. The average surface profile height is based on total surface profile height (vertical distance between a maximum profile peak height and a maximum profile valley depth) over a length of the surface.

Figure 6:
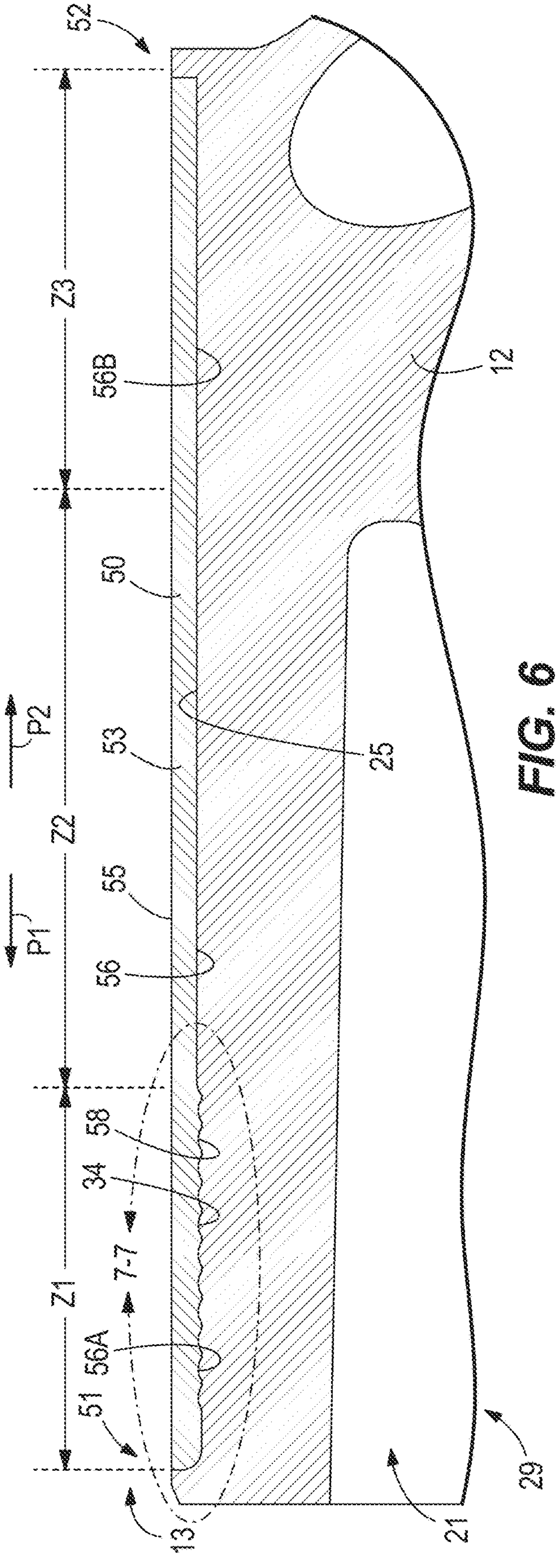
FIG. 6 is a cross-sectional view of the interface between the cylinder block and the example liner of FIG. 4.
Figure 7:
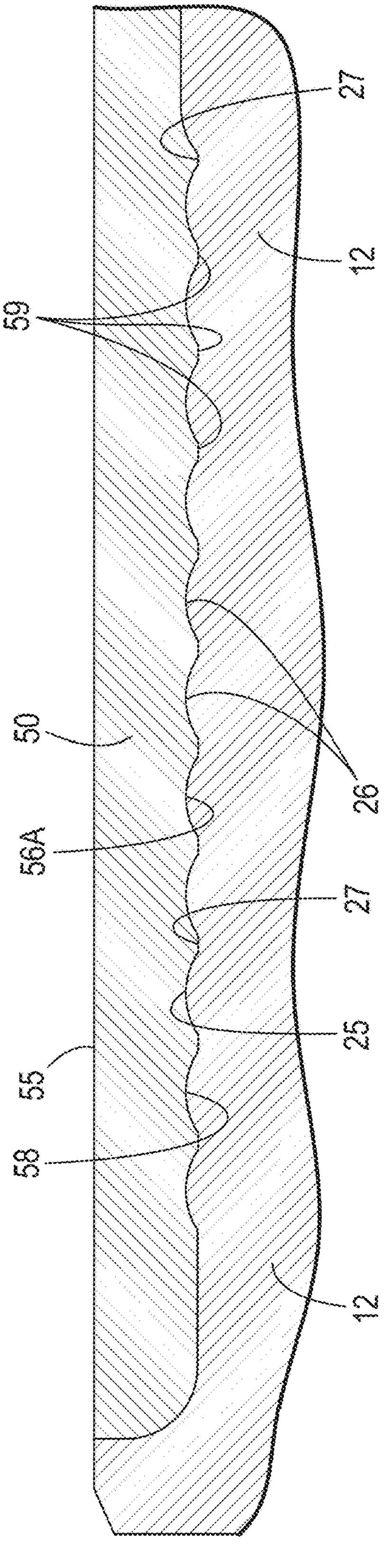
FIG. 7 is an enlarged view within line 7-7 on FIG. 6

FIGS. 6-7 depict the liner 50 of the present disclosure cast into the cylinder block 12 (see also FIG. 1). Note that the positioning of the liner 50 in the cylinder block 12 is similar to the positioning of the prior art liner 30 in the cylinder block 12 as depicted in FIGS. 2-3. However in contrast with the liner 30 depicted in FIGS. 2-3, the liner 50 of FIGS. 6-7 is positioned in the cylinder block 12 such that the grooves 58 on the first outer diameter surface portion 56A extend only in the first zone Z1 of the cylinder block 12 and the liner 30. In a non-limiting example, the grooves 58 on the first outer diameter surface portion 56A axially extend less than one-quarter the length 57 (FIG. 5) of the liner 50. Note that when the liner 50 is cast into the cylinder block 12 (as noted above), the interior surface 25 of the cylinder block 12 that faces the liner 50 is formed with protrusions 26 that forms in the grooves 34 of the liner 30 and valleys 27 that match peaks 59 of the liner 30. Note that the peaks 59 is disposed between the grooves 58. As such, the grooves 58 and the protrusions 26 together define a mechanical interface between the liner 50 and the interior surface 25 of the cylinder block 12 that thereby axially constrains the liner 50 in the cylinder bore 13, 14 and resists axial movement of the liner 50 in the cylinder bore 13, 14 as the piston 15 reciprocates (as noted above). Through research and experimentation, the present inventors have discovered that the grooves 58 can extend less than the length 57 (e.g., extend one-quarter of the length 57, extend less than one-quarter of the length 57) to axially constrain the liner 50 in the cylinder block 12.

The present inventors have also discovered that it is advantageous to provide a liner 50 devoid of grooves at the second outer diameter surface portion 56B. As such, the there are no grooves in the second zone Z2 and the third zone Z3 of the liner 30 and the cylinder block 12 and the interface between the liner 30 and the cylinder block 12 in the second zone Z2 and the third zone Z3 is a sliding interface. That is, the second outer diameter surface portion 56B facing the interior surface 25 are allowed to axially slide past and along one another as temperature and/or thermal stresses affect the liner 30 and the cylinder block 12 (see FIG. 7). That is, the second outer diameter surface portion 56B of the liner 50 is axially unconstrained with the interior surface 25 of the cylinder block 12. Thus, the liner 30 and the cylinder block 12 in the second zone Z2 and the third zone Z3 do not improperly act on each other and/or cause warping of the liner 30 as occurred in example liners that have grooves within the second zone Z2 and the third zone Z3 (see the liner 30 with the groove 34 extending between the ends 31, 32 described above with respect to FIGS. 2-3). Also, the geometry of the liner 50 depicted in FIGS. 4-7 is not adversely affected or warped. Accordingly, the liner 30 does not separate from the cylinder block 12 (see FIG. 7) and thus no radial gaps or spaces develop between the liner 30 and the cylinder block 12. Accordingly, the problems noted above (e.g., increase in blow-by gases and increased oil consumption) are reduced and/or eliminated.

In addition, during operation of the engine 10 a temperature differential occurs between the cylinder block 12 and the liner 30 due to the different materials, and the present inventors have observed that the temperature differential is larger along the second outer diameter surface portion 56B than the first outer diameter surface portion 56A due to cooling provided by the water jacket 29 via the channels 21 (see FIGS. 6-7). The second outer diameter surface portion 56B being axially unconstrained with the interior surface 25 of the cylinder block 12 (as described above) prevents radial separation between the second outer diameter surface portion 56B and the interior surface 25 of the cylinder block 12 which otherwise would occur due to the temperature differential. Note that while the channel 21 of the water jacket 29 (see FIG. 6) is radially spaced part from grooved interface between the liner 50 and the cylinder block 12 within the first zone Z1, the radial projection of the channel 21 toward the liner 50 overlaps the entire portion of the grooved interface within the first zone Z1. As such, the water jacket 29 provides cooling along the entire interface within the first zone Z1 and the portions of the liner 50 and the cylinder block 12 within the first zone Z1. In contrast, the channel 21 of the water jacket 29 does not overlap the entire sliding interface between the liner 50 and the cylinder block 12 within the second zone Z2. As such, the water jacket 29 does not provide cooling along the entire interface within the second zone Z2. Note that the water jacket 29 may provide some amount of cooling in the third zone Z3 due to the thermal transfer of heat through the cylinder block 12. Further note that the first outer diameter surface portion 56A and the first end 51 of the liner 50 are located closer to the channel 21 of the water jacket 29 than the second end 52 of the liner 50 and the portion of the second outer diameter surface portion 56B near the second end 52.

The exemplary embodiments described in this present disclosure and depicted herein teach methods and assemblies for forming aluminum cylinder blocks having port and starboard banks of cylinder bores that are angled towards each other in a V-shape; however it should be recognized that the concepts taught in the present disclosure are equally applicable to methods of making cylinder blocks of other types of metal and having any number of cylinder bores, for example but not limited to four, six, ten, or twelve cylinders. Also, the inventive concepts taught in the present disclosure are equally applicable to methods of making cylinder blocks having an inline or any other cylinder bore configuration.

In certain examples, a marine engine includes a cylinder block which defines a cylinder bore, and a liner disposed in the cylinder bore. The liner being axially elongated and providing a piston running surface. The liner including a first outer diameter surface portion which is axially constrained with respect to with an interior surface of the cylinder block and a second outer diameter surface portion which is axially unconstrained with respect to the interior surface of the cylinder block. Optionally, the liner has a length and the first outer diameter surface portion extends along less than one quarter of the length and the second outer diameter surface portion extends along greater than three quarters of the length. Optionally, the first outer diameter surface portion has a continuous helical groove which is mated with the interior surface of the cylinder block and wherein the second outer diameter surface portion is devoid of grooves. Optionally, the first outer diameter surface portion is adjacent to the second outer diameter surface portion. Optionally, the second outer diameter surface portion is smoother than the first outer diameter surface portion. Optionally, the cylinder block and the liner are made of different materials. Optionally, the cylinder block is made of aluminum and the liner is made of iron. Optionally, cylinder block defines a water jacket overlaps the first outer diameter surface portion. During operation of the marine engine a temperature differential occurs between the cylinder block and the liner due to the different materials. The temperature differential being larger along the second outer diameter surface portion than the first outer diameter surface portion due to cooling via the water jacket. The second outer diameter surface portion being axially unconstrained with the interior surface of the cylinder block prevents radial separation between the second outer diameter surface portion and the interior surface of the cylinder block which otherwise would occur due to the temperature differential.

In certain examples, a marine engine includes a cylinder block which defines a cylinder bore and a liner disposed in the cylinder bore. The liner providing piston running surface and the liner has a first outer diameter surface portion which is mated with an interior surface of the cylinder block and a second outer diameter surface portion which is unmated with the interior surface of the cylinder block. Optionally, the liner has a length and the first outer diameter surface portion extends along less than one quarter of the length and wherein the second outer diameter surface portion extends along greater than three quarters of the length. Optionally, the first outer diameter surface portion comprises a continuous helical groove which is mated with the interior surface of the cylinder block and wherein the second outer diameter surface portion is devoid of grooves. Optionally, the first outer diameter surface portion is adjacent to the second outer diameter surface portion. Optionally, the second outer diameter surface portion is smoother than the first outer diameter surface portion. Optionally, the cylinder block and the liner are made of different materials. Optionally, the cylinder block is made of aluminum and the liner is made of iron. Optionally, the cylinder block defines a water jacket overlaps the first outer diameter surface portion. During operation of the marine engine a temperature differential occurs between the cylinder block and the liner due to the different materials, the temperature differential being larger along the second outer diameter surface portion than the first outer diameter surface portion due to cooling via the water jacket. The second outer diameter surface portion being axially unconstrained with the interior surface of the cylinder block prevents radial separation between the second outer diameter surface portion and the interior surface of the cylinder block which otherwise would occur due to the temperature differential.

In certain examples, a method of making a marine engine includes the steps of providing a liner which is configured to provide a piston running surface, the liner having a first outer diameter surface portion and a second outer diameter surface portion which is smoother than the first outer diameter surface portion, and casting the liner in place in a cylinder bore of a cylinder block such that the first outer diameter surface portion is axially constrained with respect to an interior surface of the cylinder block and such that the second outer diameter surface portion is axially unconstrained with respect to the interior surface of the cylinder block. Optionally, the liner has a length and wherein the first outer diameter surface portion extends along less than one quarter of the length and wherein the second outer diameter surface portion extends along greater than three quarters of the length. Optionally including the step of forming the liner out of iron and casting the cylinder block out of aluminum. Optionally including the step of casting the cylinder block to define a water jacket which is located along the first outer diameter surface portion, such that during operation of the marine engine a temperature differential occurs between the iron of the liner and the aluminum of the cylinder block. The temperature differential being larger along the second outer diameter surface portion than the first outer diameter surface portion due to cooling via the water jacket. The second outer diameter surface portion being axially unconstrained with the interior surface of the cylinder block prevents radial separation between the second outer diameter surface portion and the interior surface of the cylinder block which otherwise would occur due to the temperature differential.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A marine engine comprising:

a cylinder block that defines a cylinder bore; and a liner that is cast in place in the cylinder bore, the liner being axially elongated and providing a piston running surface, wherein the liner comprises a first outer diameter surface portion defined by one or more grooves, wherein along the first outer diameter surface portion, the cylinder block has an interior surface with one or more protrusions, said one or more protrusions being formed by casting the liner in place in the cylinder bore such that said one or more protrusions are interdigitated with said one or more grooves and thus together provide a mating interface that axially constrains back and forth movement of the liner with respect to the interior surface, and wherein the liner comprises a second outer diameter surface portion that is smoother than the first outer diameter surface portion and is axially unconstrained with respect to the interior surface under operating conditions of the marine engine, and wherein the second outer diameter surface portion abuts the cylinder block along a length of the liner, thereby inhibiting fluid flow between the second outer diameter surface portion and the cylinder bore.

2. The marine engine according to claim 1, wherein the first outer diameter surface portion extends along less than one quarter of the length and wherein the second outer diameter surface portion extends along greater than three quarters of the length.

3. The marine engine according to claim 1, wherein the first outer diameter surface portion is adjacent to the second outer diameter surface portion.

4. The marine engine according to claim 1, wherein the cylinder block is cast using a first material that expands at a first rate as temperature increases and the liner is made using a second material that expands at a second rate as temperature increases, wherein the second rate is lower than the first rate.

5. The marine engine according to claim 1, wherein the cylinder block and the liner are made of different materials.

6. The marine engine according to claim 5, wherein the cylinder block is made of aluminum and the liner is made of iron.

7. The marine engine according to claim 5, wherein the cylinder block defines a water jacket that overlaps the first outer diameter surface portion;

wherein during operation of the marine engine a temperature differential occurs between the cylinder block and the liner due to the different materials, the temperature differential being larger along the second outer diameter surface portion than the first outer diameter surface portion due to cooling via the water jacket; and wherein the second outer diameter surface portion being axially unconstrained with the interior surface of the cylinder block prevents radial separation between the second outer diameter surface portion and the interior surface of the cylinder block which otherwise would occur due to the temperature differential.

8. The marine engine according to claim 1, wherein the liner is elongated along an axis and comprises a first end proximate to the first outer diameter surface portion, and the cylinder block has an overlapping portion being formed by casting the liner in place in the cylinder bore such that the overlapping portion covers at least a portion of the first end along the axis and provides a second interface that axially constrains movement of the first end of the liner with respect to the interior surface.

9. The marine engine according to claim 8, wherein the overlapping portion comprises a first surface that extends axially along the axis and a second surface that abuts the first end of the liner thereby axially constraining movement of the first end of the liner with respect to the interior surface in at least one direction.

10. A method of making a marine engine, the method comprising:

providing a liner configured to provide a piston running surface, the liner having a first outer diameter surface portion defined by one or more grooves and a second outer diameter surface portion which is smoother than the first outer diameter surface portion; and casting the liner in place in a cylinder bore of a cylinder block such that during casting the cylinder bore is provided with an interior surface along the first outer diameter surface portion having one or more protrusions interdigitated with said one or more grooves, said one or more grooves and said one or more protrusions together providing a mating interface that axially constrains back and forth movement of the liner with respect to the interior surface, and such that the cylinder bore is provided with a smoother interior surface that abuts the second outer diameter surface portion along a length of the liner, thereby inhibiting fluid flow between the second outer diameter surface portion and the cylinder bore, and does not axially constrain the second outer diameter surface under operating conditions of the marine engine.

11. The method according to claim 10, wherein the liner has a length and wherein the first outer diameter surface portion extends along less than one quarter of the length and wherein the second outer diameter surface portion extends along greater than three quarters of the length.

12. The method according to claim 10, further comprising forming the liner out of iron and casting the cylinder block out of aluminum.

13. The method according to claim 12, further comprising:

casting the cylinder block to define a water jacket that overlaps the first outer diameter surface portion, such that during operation of the marine engine a temperature differential occurs between the iron of the liner and the aluminum of the cylinder block, the temperature differential being larger along the second outer diameter surface portion than the first outer diameter surface portion due to cooling via the water jacket; and wherein the second outer diameter surface portion being axially unconstrained with the interior surface of the cylinder block prevents radial separation between the second outer diameter surface portion and the interior surface of the cylinder block which otherwise would occur due to the temperature differential.

14. A marine engine comprising:

a cylinder block that defines a cylinder bore having an interior surface; and an axially elongated liner that is cast in place in the cylinder bore and has an axial length, the liner providing a piston running surface and comprising:

a first end;

a second end;

a first outer diameter surface portion defined by one or more grooves configured to constrain axial movement of the liner with respect to the cylinder block caused by frictionally generated axial forces applied by a piston reciprocating within the liner, wherein the first outer diameter surface portion is proximate to the first end; and a second outer diameter surface portion that is smoother than the first outer diameter surface portion, the second outer diameter surface portion configured to facilitate axial movement of the liner with respect to the cylinder block caused by thermal expansion under operating conditions of the marine engine, wherein along the first outer diameter surface portion, a first portion of the interior surface comprises one or more protrusions, said one or more protrusions being formed by casting the liner in place in the cylinder bore such that said one or more protrusions are interdigitated with said one or more grooves and thus together provide a first interface between the liner and the interior surface that constrains axial motion of the liner with respect to the cylinder block caused by reciprocation of the piston, wherein along the second outer diameter surface portion, a second portion of the interior surface abuts the second outer diameter surface portion providing a second interface between the liner and the interior surface that facilitates axial motion of the liner with respect to the cylinder block caused by thermal expansion under operating conditions of the marine engine, and wherein at the first end of the liner, a third portion of the interior surface abuts the first end of the liner providing a third interface between the liner and the interior surface that constrains axial motion of the liner with respect to the cylinder block caused by reciprocation of the piston.

15. The marine engine according to claim 14, wherein the first outer diameter surface portion extends along less than one quarter of the axial length and wherein the second outer diameter surface portion extends along greater than three quarters of the axial length.

16. The marine engine according to claim 14, wherein the first outer diameter surface portion is adjacent to the second outer diameter surface portion.

17. The marine engine according to claim 14, wherein the cylinder block is cast using a first material that expands at a first rate as temperature increases and the liner is made using a second material that expands at a second rate as temperature increases, wherein the second rate is lower than the first rate.

18. The marine engine according to claim 14, wherein the cylinder block and the liner are made of different materials.

19. The marine engine according to claim 18, wherein the cylinder block is made of aluminum and the liner is made of iron.

20. The marine engine according to claim 18, wherein the cylinder block defines a water jacket that overlaps the first outer diameter surface portion;

wherein during operation of the marine engine a temperature differential occurs between the cylinder block and the liner due to the different materials, the temperature differential being larger along the second outer diameter surface portion than the first outer diameter surface portion due to cooling via the water jacket; and wherein the second outer diameter surface portion being axially unconstrained with the interior surface of the cylinder block prevents radial separation between the second outer diameter surface portion and the interior surface of the cylinder block which otherwise would occur due to the temperature differential.

* * * * *